No. 740,287.

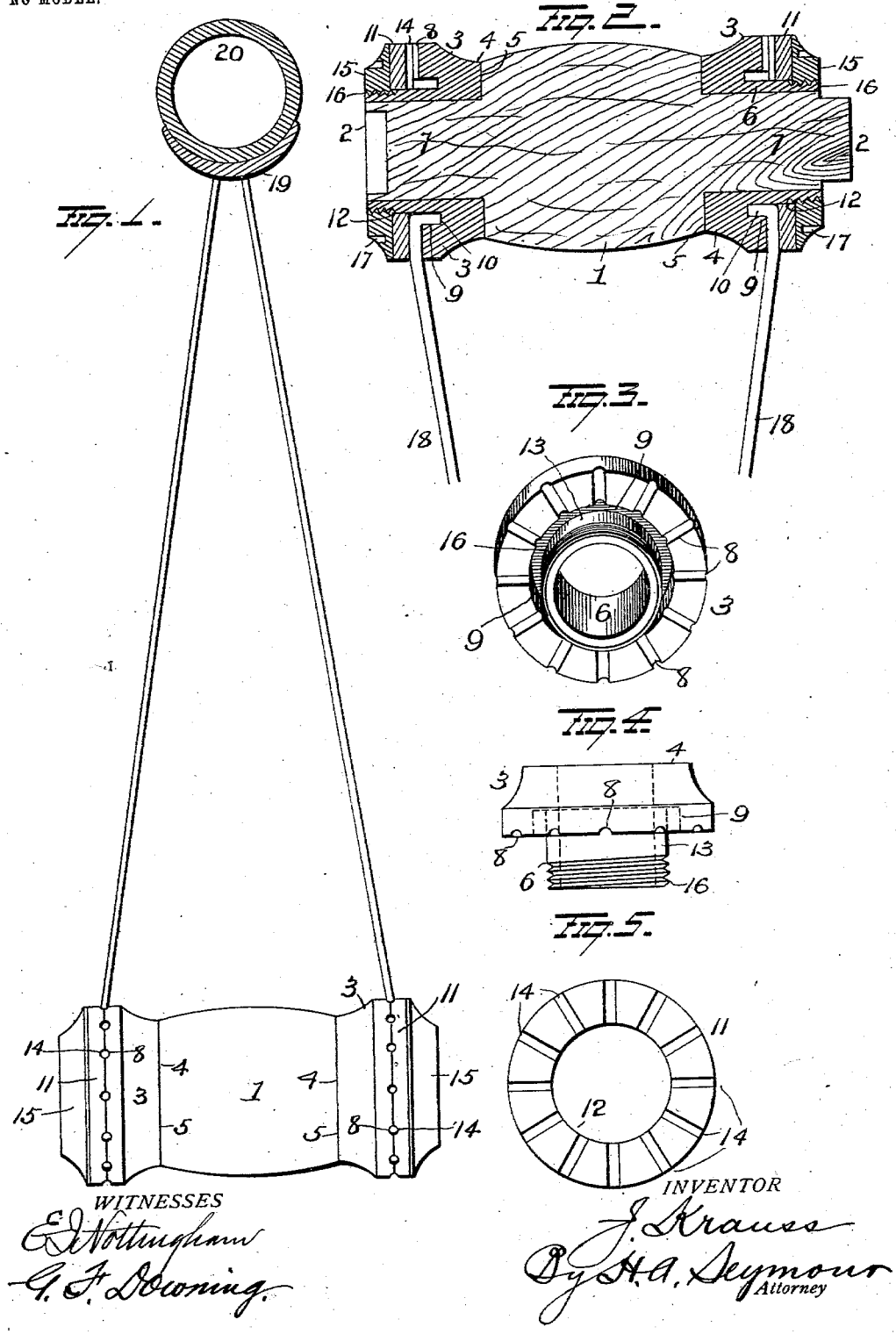

Patented September 29, 1903.

UNITED STATES PATENT OFFICE.

JACOB KRAUSS, OF LEXINGTON, KENTUCKY.

WHEEL-HUB.

SPECIFICATION forming part of Letters Patent No. 740,287, dated September 29, 1903.

Application filed January 21, 1903. Serial No. 140,005. (No model.)

*To all whom it may concern:*

Be it known that I, JACOB KRAUSS, of Lexington, in the county of Fayette and State of Kentucky, have invented certain new and useful Improvements in Wheel-Hubs; and I do hereby declare the following to be a full, clear, and exact description of the invention, such as will enable others skilled in the art to which it appertains to make and use the same.

My invention relates to an improvement in wheel-hubs, the object being to provide a wooden hub with means for firmly securing wire spokes in place and to permit of their ready removal and renewal.

With this object in view my invention consists in certain novel features of construction and combination of parts, as will hereinafter be described, and pointed out in the claim.

In the accompanying drawings, Figure 1 is a view in side elevation of the hub, the rim and tire being shown in transverse section. Fig. 2 is a longitudinal section. Figs. 3, 4, and 5 are detailed views illustrating different parts of the hub.

1 represents a wooden hub, which may be made of any desired form and size. Each end of the hub is provided with a tenon 2, upon which is firmly secured a metal ring 3. The end 4 of each ring seats against the shoulder 5 of tenon 2, and the inner surface of the extended sleeve 6 fits snugly on the projecting end 7 of the hub. The ring 3 has its outer face provided with a series of radial grooves 8, in which fit the inner ends of the wire spokes, and is constructed with an annular recess 9, which is of the required width and depth to receive the bent ends 10 of the spokes.

11 is an annular ring or washer provided with a central opening 12, the diameter of which is of the proper size to snugly fit upon the smooth surface 13 of sleeve 6. The inner face of the ring or washer 11 is provided with a series of radial grooves 14, which receive the spokes and retain them in place. A nut 15 screws onto the threaded portion 16 of sleeve 6 and serves to retain the spokes in place. The nut is constructed with notches or holes 17 to permit of the attachment of a spanner-wrench for removing and replacing the nut.

The wire spokes 18 are secured at their outer ends to the rim 19, which may be provided with a pneumatic tire 20 or with a solid tire.

My invention relates especially to an improvement on the construction of hub for which Letters Patent No. 715,087 were granted to me December 2, 1902. In the hub shown and described in my patent referred to the screw-threaded sleeve is made separate from the ring 3, an annular recess being formed between them for the reception of the bent ends of the wire spokes. In such construction when the nut is screwed onto the sleeve to secure the spokes in place a considerable outward pulling strain is exerted on the sleeve, which tends to pull it outwardly and away from the end of the hub, and hence it is necessary to secure the sleeve to the end of the hub in as firm a manner as is possible. In my improvement the sleeve and ring being made in a single piece allows it to have an extended bearing on the wooden hub, which insures so great a frictional contact therewith as to effectually withstand all outward pulling strains that may be exerted thereon by the nut.

Having fully described my invention, what I claim as new, and desire to secure by Letters Patent, is—

The combination with a wooden hub, contracted at its ends, of a metallic sleeve on each contracted end of the wooden hub, each sleeve enlarged at one end and threaded at the other end, forming an annular shoulder provided with radial grooves, said sleeve having an annular groove at the inner edge of said annular shoulder, a ring on the plain portion of each sleeve beyond said annular shoulder thereon, each of said rings having radial grooves in its rear face, and a nut on the threaded end of each sleeve.

In testimony whereof I have signed this specification in the presence of two subscribing witnesses.

JACOB KRAUSS.

Witnesses:
S. G. NOTTINGHAM,
A. W. BRIGHT.